United States Patent [19]
Hendrickson

[11] Patent Number: 5,950,110
[45] Date of Patent: Sep. 7, 1999

[54] JAMMING DETECTION IN A WIRELESS SECURITY SYSTEM

[75] Inventor: Robert C. Hendrickson, Minneapolis, Minn.

[73] Assignee: Interactive Techanologies, Inc., North St. Paul, Minn.

[21] Appl. No.: 08/907,180

[22] Filed: Aug. 6, 1997

[51] Int. Cl.⁶ .............................. H04K 3/00; H04B 17/00
[52] U.S. Cl. ............................... 455/1; 455/63; 455/67.3; 340/539
[58] Field of Search .................................. 455/1, 63, 67.3, 455/226.1, 226.2, 226.4, 67.1; 340/539; 324/76.11; 342/13, 16, 17, 28

[56] References Cited

U.S. PATENT DOCUMENTS

| | | | |
|---|---|---|---|
| 3,618,083 | 11/1971 | Burley et al. | 343/5 PD |
| 3,648,287 | 3/1972 | Lind | 343/18 E |
| 3,720,944 | 3/1973 | Kramer et al. | 343/18 E |
| 3,961,323 | 6/1976 | Hartkorn | 340/539 |
| 4,109,239 | 8/1978 | Davis | 340/539 |
| 4,434,505 | 2/1984 | Gutleber | 455/50 |
| 4,462,022 | 7/1984 | Stolarczyk | 340/506 |
| 4,479,246 | 10/1984 | Young | 455/50 |
| 4,611,198 | 9/1986 | Levinson et al. | 340/539 |
| 4,688,041 | 8/1987 | Cronson et al. | 342/17 |
| 4,737,771 | 4/1988 | Coash | 340/539 |
| 4,855,713 | 8/1989 | Brunius | 340/506 |
| 5,144,642 | 9/1992 | Weinberg et al. | 455/226.1 |
| 5,173,701 | 12/1992 | Dijkstra | 342/17 |
| 5,297,171 | 3/1994 | Koch | 375/100 |
| 5,379,043 | 1/1995 | Bishop | 342/17 |
| 5,450,623 | 9/1995 | Yokoyama et al. | 455/226.1 |
| 5,708,975 | 1/1998 | Heiskari et al. | 455/63 |

*Primary Examiner*—Dwayne D. Bost
*Assistant Examiner*—Quochien B. Vuong
*Attorney, Agent, or Firm*—Fish & Richardson P.C., P.A.

[57] ABSTRACT

In a wireless security system having a plurality of RF sensor/transmitters and a system controller, jamming signals are detected by comparing a near-term noise value with the expected signal strength of transmissions from the RF sensor/transmitters minus a detection threshold, and with the sum of a long-term noise value and a jamming threshold. In addition, the trend of the long-term noise value is analyzed to determine whether a jamming signal is being intentionally and gradually introduced into the security system environment. The system controller may include a plurality of antennas. Jamming may be detected for each antenna or for all of the antennas, collectively.

35 Claims, 9 Drawing Sheets

JAMMING DETECTION IN A WIRELESS SECURITY SYSTEM

FIELD OF THE INVENTION

The invention relates to jamming detection in a wireless security system.

BACKGROUND OF THE INVENTION

Wireless monitoring or security systems include one or more sensor/transmitter units which send signals, e.g., coded radio-frequency (RF) message packets, to a system controller. The system controller decodes the message packets and, based on the content of the packets, may produce an alarm or other indication of a condition at the sending sensor/transmitter unit. The sensor condition may indicate the existence of a fire, an intrusion, an emergency, the failure of an appliance, or other condition desired to be monitored. Additionally, a sensor/transmitter may send periodic supervisory message packets.

The system controller includes one or more antennas for receiving the message packets. Every environment where a security system may be used (e.g., home, business, warehouse, etc.), includes other electronic signals, commonly known as "noise", that are received on the system controller antennas. Much of the noise is at a relatively low energy level and does not typically disrupt the reception of sensor/transmitter signals. Therefore, the low-level noise can be ignored by the security system.

When the noise reaches a certain level, however, it may prevent or disrupt the reception of the sensor/transmitter signals by the system controller. The disruption of the sensor/transmitter signals is typically referred to as "jamming." The jamming may be intentional, i.e., to defeat the security system, which an intruder may abruptly or gradually introduce into the security system environment. The jamming may also be unintentional, i.e., from a source generating a signal or by-product signal of sufficient strength to disrupt the reception of sensor/transmitter signals.

In either case, the jamming signals may prevent or disrupt the reception of sensor/transmitter signals by the system controller. Consequently, the system controller may not receive alarm message packets or supervisory message packets from one or more sensor/transmitters. The failure to receive the sensor/transmitter signals greatly compromises the effectiveness of the security system. Indeed, the Underwriters Laboratory (UL) requires an audible and visual indication at the system controller if there is any unwanted (interfering) transmission for a continuous period of 20 seconds or more, that would inhibit any status change signaling within the system (i.e., where the interfering transmission would prevent the detection of transmissions from the transmitters within the security system).

A disruption in reception may also be caused by insufficient transmission strength due, for example, to a low battery condition in one of the sensor/transmitters, though perhaps not so low so as to cause an indication of such. The incorrect interpretation of such conditions as a jamming condition (i.e., an alarm condition) may cause a homeowner unnecessary stress and perhaps false-alarm fees from a monitoring company.

SUMMARY OF THE INVENTION

According to the present invention, jamming detection is provided in a security system having a plurality of transmitters and a system controller with one or more antennas. The system controller determines a long-term noise value and an approximation of the immediate noise level, i.e., a short-term noise value. The system controller also determines an expected received RF signal strength value for a predetermined transmitter, which preferably is the transmitter whose signal is the weakest as received by the system controller. An indication of the existence of a jamming condition is made by the system controller if, for a predetermined period of time of, for example, about twenty seconds, the following two conditions exist: (1) the short-term noise value exceeds the sum of the long-term noise value and a predetermined jamming threshold of, for example, 20 dB; and (2) the short-term noise value exceeds the expected RF signal strength minus a detection threshold.

By requiring that both conditions be met, an unnecessary jamming indication is avoided when, although there is a sudden increase in the noise level, RF signals received from the transmitters will still have sufficient signal strength to be detected. Further, an unnecessary jamming indication is also avoided when there is no longer a sufficient detection threshold, but where that condition is the result of reduced transmission strength from the RF transmitter, for example, because the transmitter's battery is low.

In addition, the trend of the long-term noise value may be analyzed. A gradual but significant increase in the long-term noise value may indicate that a jamming signal has been gradually introduced. With the additional trending information, a low battery condition may be distinguished from a condition where a jamming signal is intentionally and gradually introduced into the security system environment (a case where the trend of the long-term noise value would not be increasing).

The present invention provides further advantages. First, the jamming detection parameters, including the long-term and short-term noise values, a weakest transmitter, and the transmitters' signal strength are periodically updated. Also, the jamming detection is dynamic and flexible, i.e., it can be performed antenna by antenna, or by analyzing the antennas collectively. Other advantages and features will become apparent from the following description and claims.

DESCRIPTION OF THE PREFERRED EMBODIMENTS

Figure 1:
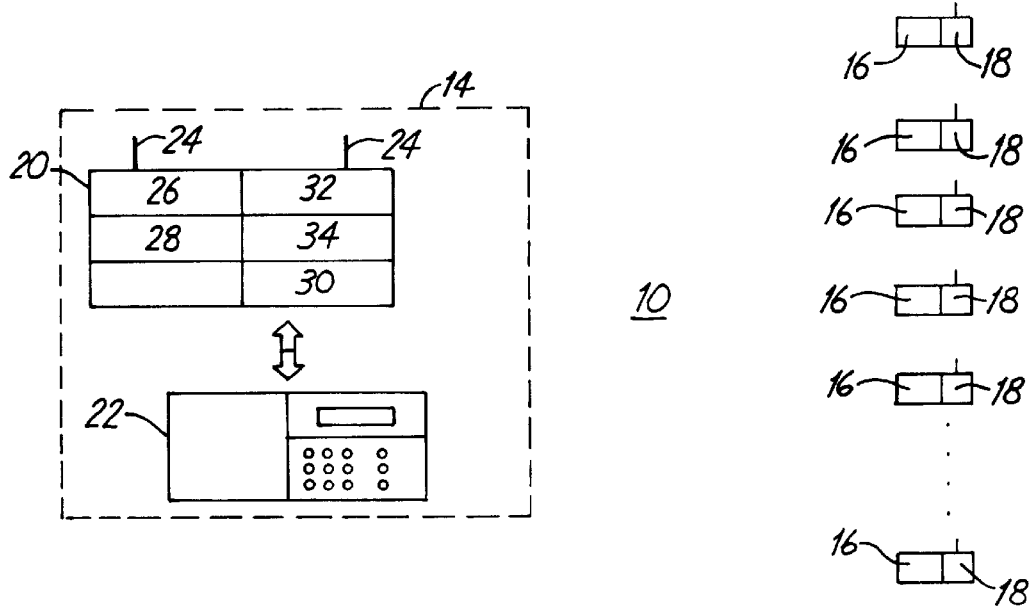
FIG. 1 is a block diagram of a wireless security system.

FIG. 1 is a block diagram of a wireless security system 10. Wireless security system 10 includes a system controller 14 which receives RF transmissions from a plurality of sensors 16, each having an associated RF transmitter 18. The sensors 16 can be any of a wide variety of known sensors, including motion detectors, door/window contacts, smoke detectors, and sound detectors. The RF transmitters 18 generate RF transmissions having message packets containing information regarding the associated sensor 16, including whether the associated sensor 16 has detected a change of condition. Transmitter 18 may also generate periodic supervisory message packets.

The number of sensors 16, and associated transmitters 18, in a system 10 can vary widely depending upon the environment to be protected and the goals and objectives selected for the system 10. For example, in an apartment or home, five to fifteen sensors 16 may be used in a system 10. In industrial or warehouse applications, there may be hundreds of sensors 16 in a system 10.

System controller 14 receives encoded RF message packets sent by transmitters 18, decodes the messages, and generates responses based on the content of the messages. If the message packets indicate a change in condition, system controller 14 may generate a visual or sound alarm, or alert an outside agency such as the fire department, police department, or monitoring station, by telephone or wireless communication.

In one embodiment, system controller 14 includes a receiving unit 20 that communicates with a control unit 22. Receiving unit 20 and control unit 22 may be configured as a single unit (not shown) or as discrete units, as shown in FIG. 1. Receiving unit 20 includes one or more antennas 24, a demodulator or decoding circuit 26, a processor 28 to analyze the decoded information, and an input/output coupling 30 for communication with control unit 22. A signal-strength circuit 32 measures the strength of the signals received on each antenna 24. Signal-strength circuit 32 may be part of demodulator circuit 26. Receiving unit 20 also includes memory 34 for storing instructions and variables.

The control unit 22 receives the decoded message packets from the receiving unit 20 and processes the packets. Control unit 22 may also include a user interface, e.g., a key pad and display.

In the embodiment shown in FIG. 1, receiving unit 20 includes two antennas 24, designated LA (Left Antenna) and RA (Right Antenna). Multiple antennas are used for spatial diversity and to eliminate nulls. While this embodiment is described with two antennas, a system controller 14 could also operate in a similar manner with any number of antennas.

When the wireless security system 10 is installed, a unique identity (ID) code associated with each transmitter 18 is programmed into the system controller 14. One method of programming transmitter 18 identity codes is described in commonly assigned U.S. Pat. No. 4,855,713 (Brunius), which is incorporated herein by reference. After transmitter 18 ID code programming is complete, when the system controller 14 receives a transmission with a message packet having one of the programmed identity codes, the system controller 14 recognizes that the transmission came from one of its transmitters 18 and knows from which particular transmitter 18 the transmission came.

Overview of the Jamming Detection Method

Figure 2:
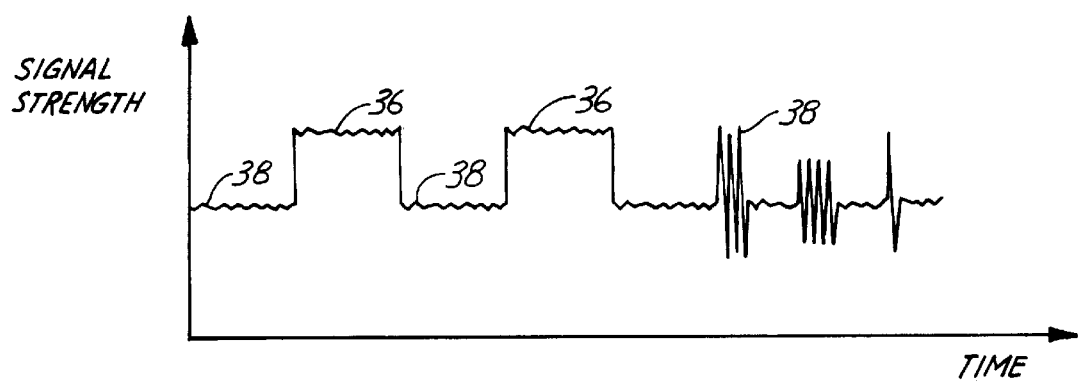
FIG. 2 shows exemplary signals received by a system controller.

Referring to FIG. 2, receiving unit 20 looks for jamming signals only when it is not receiving message packets 36 from the transmitters 18. Receiving unit 20 distinguishes message packets 36 from other signals, for example, by a front porch pulse of a predetermined length and/or synchronization bits at the beginning of the message packets. Noise signals 38 received during periods when receiving unit 20 is not receiving message packets 36 are analyzed to determine whether the system controller 14 is being jammed. When the receiving unit 20 detects a jamming signal, the information is conveyed to the control unit 22 for processing.

To determine whether a jamming signal is occurring, a reference noise level or "long-term noise value" is first determined. The long-term noise value may be the average noise level measured, for example, over the past one hour. For example, the long-term noise value may be an average of the most recent 14,400 sampled noise level measurements, where measurement samples are taken every quarter of a second.

Figure 3:
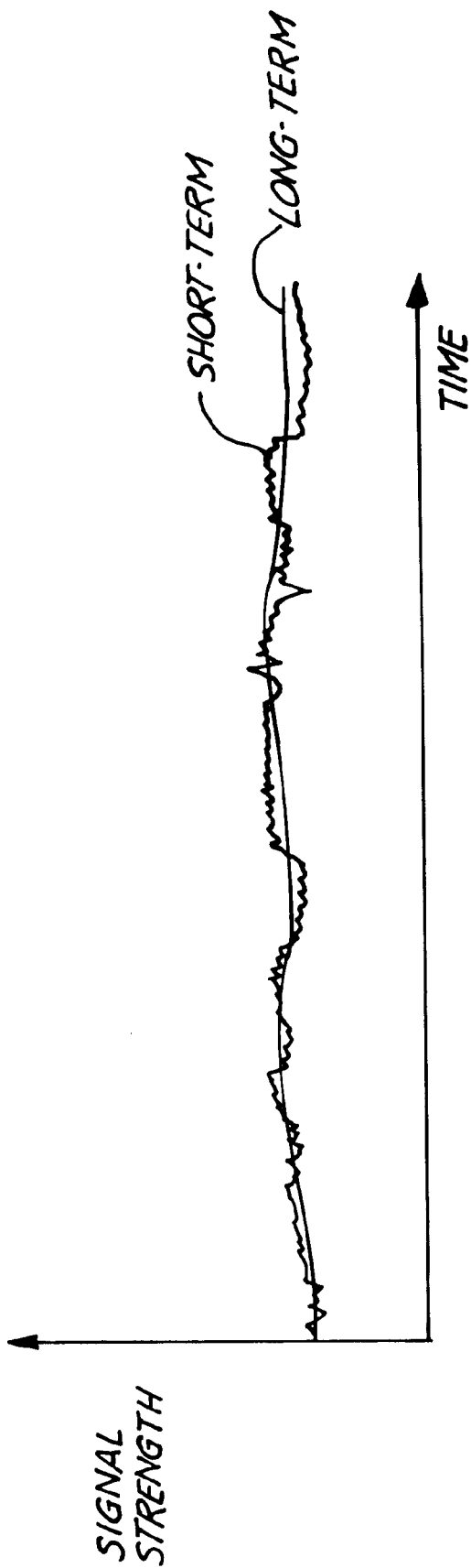
FIG. 3 is a graph of signal strength versus time, showing exemplary short-term and long-term noise values.

A "short-term noise value" is also determined, which may be the average noise level measured, for example, during the past two seconds (i.e., the average of the most recent eight samples). FIG. 3 shows a plot of example long-term and short-term noise averages.

The short-term noise value exceeding the long-term noise value by a predetermined jamming threshold (JT) (for example, 20 dB) has been found to indicate that a jamming signal has suddenly been entered into the security system 10 environment. It may be advantageous to wait until this condition persists for a predetermined time period of about, for example, twenty seconds before any jamming condition is indicated by the system controller 14 (that is, the Underwriters Laboratory requirement). In addition, using an average for the short-term noise value was found to be advantageous over a single noise measurement (that is, a single sample), because the averaging approach ignores a spike in the noise level that does not last for more than a single, or a few, sampling periods. However, non-averaged short-term noise values may be used, if it is further determined that successive individual elevated noise level measurements substantially persist over the predetermined time period of about twenty seconds.

The short-term noise value exceeding the long-term noise value by the predetermined jamming threshold does not necessarily mean that the system controller 14 will not be able to detect transmissions from the transmitters 18. Indeed, transmissions may have a sufficiently strong signal strength to be detected despite the elevated noise level. In such a case it is not necessary, nor is it desirable, that the system controller 14 indicate a jamming condition.

To prevent an unnecessary jamming indication, the system controller 14 determines the weakest signal strength that is expected from transmissions from the transmitters 18. Transmitters 18 are typically battery-powered. Due to the characteristics of each transmitter 18, the frequency of usage, the distance from transmitter 18 to system controller 14, and the strength of the transmitter's battery, the signal strength of transmitters 18 in a security system 10 vary. The signal strength of any given transmitter 18 also varies over time, primarily due to changes in the battery strength. The transmitter 18 having the weakest RF signal strength as received by the receiving unit 20 will be referred to as the "weak transmitter."

RF signals require sufficient modulation depth to be detected by the receiving unit 20 of the system controller 14. In particular, the amount that the signal strength must exceed the noise level before the signal can be accurately detected is referred to as a detection threshold (DT). If the noise level exceeds the signal strength minus the detection threshold, the signal will not be detected. Also, it is likely that an RF signal from one of the transmitters 18 will not be detected if the short-term noise value exceeds the weakest expected RF signal strength (i.e., the strength of the RF signal expected to be received from the weak transmitter) minus the detection threshold.

It is therefore advantageous that the system controller 14 only indicate the existence of a jamming condition when the short-term noise value exceeds both of the following measures: (1) the long-term noise value plus the predetermined jamming threshold; and (2) the minimum expected signal strength minus the detection threshold. In addition, it may be advantageous to require, before the jamming condition is indicated by the system controller 14, that both conditions persist for a predetermined time period of about, for example, twenty seconds.

By requiring both conditions be met, an unnecessary jamming indication is avoided when, although there is a sudden increase in the noise level, RF signals received from the transmitters 18 will still have sufficient signal strength to be detected. Further, an unnecessary jamming indication is also avoided when there is no longer a sufficient detection threshold, but where that condition is the result of reduced transmission strength from the RF transmitter 18, for example, because the transmitter's battery is low. This is because the absence of a sudden increase in the noise level indicates that the loss of sufficient detection threshold is the result of poor transmission strength.

It is also advantageous to protect the security system 10 against a jamming signal being gradually, instead of suddenly, introduced into the security system 10 environment by a potential intruder. In this case, the short-term noise value may exceed the weakest expected signal strength minus the detection threshold, but may not exceed the long-term noise value plus the predetermined jamming threshold. In other words, and referring to the two conditions above, condition (2) is met, but condition (1) is not.

To detect the gradually introduced jamming signal, the trend of the long-term noise value may be analyzed. A gradual but significant increase in the long-term noise value may indicate that a jamming signal has been gradually introduced. The trend of the long-term noise value may be analyzed over a relatively long period of time, which could be about an hour or as long as several days. The length of the period that is analyzed would be selected to be a maximum, but practical, amount of time over which a signal could be gradually introduced. In addition, long-term noise value trends over time periods of different lengths may be analyzed. With the additional trending information, a jamming condition is indicated where condition (2) is met, and where the long-term noise value trend is gradually increasing by a predetermined amount. The jamming condition is therefore indicated despite condition (1) not being met. With this additional capability, the case of a jamming signal being intentionally and gradually introduced into the security system 10 environment is distinguishable from the case of a low battery at one of the transmitters 18. The latter case is one where the short-term noise value may exceed the minimum expected signal strength minus the detection threshold, but where the trend of the long-term noise value would not be increasing.

Details of the Jamming Detection Method

In the receiving unit 20, several variables are initialized when the security system 10 is installed or reset. The variables include:

| | |
|---|---|
| LW | Left Antenna - Weak Transmitter |
| RW | Right Antenna - Weak Transmitter |
| LWLEV | Left Antenna - Weak Transmitter Level |
| RWLWV | Right Antenna - Weak Transmitter Level |
| PLW | Left Antenna - Proposed Weak Transmitter |
| PRW | Right Antenna - Proposed Weak Transmitter |
| PWLLEV | Left Antenna - Proposed Weak Transmitter Level |
| PWRLEV | Right Antenna - Proposed Weak Transmitter Level |

Values for these variables are stored in memory 34.

The "weak transmitter" (either LW or RW) variable is the transmitter 18 that sends the RF signal that is the weakest as received by the respective antenna, RA or LA. Because at installation it is difficult to identify the "weak transmitter," one of the transmitters 18 is randomly selected and initialized for each of RW and LW. The "proposed weak transmitter" variables, PLW and PRW, are used to periodically update the weak transmitters, LW and RW, as there is a change in which transmitter 18 is the weakest. As with the LW and RW variables, the PLW and PRW variables may be initialized with any randomly selected transmitter 18.

Signal strength values for each of the four above transmitters (LW, RW, PLW, and PRW) are then initialized. As discussed below, these values are periodically updated during operation; therefore, a rough guess is entered as the initialization values. The rough guess may be predetermined and stored in read-only memory at the time of manufacture.

For each antenna (LA and RA) a short-term noise average and long-term noise average are computed. These averages are represented by the following variables:

| | |
|---|---|
| LSNA | Left Antenna - Short-Term Noise Average |
| RSNA | Right Antenna - Short-Term Noise Average |
| LLNA | Left Antenna - Long-Term Noise Average |
| RLNA | Right Antenna - Long-Term Noise Average |

The short-term noise averages, LSNA and RSNA, are generally weighted toward the most recent noise level readings and fluctuate relatively rapidly, e.g., over a time period of several seconds. The short-term averages are initially set to zero. The long-term noise averages, LLNA and RLNA, are based on a much larger number of noise level readings over an extended period and, consequently, the long-term noise averages are fairly steady, varying on the time scale of one or more hours. An estimated value is entered to initialize the long-term averages, LLNA and RLNA. The estimated values may be determined during the design of the system 10 and entered into read-only memory (ROM) during manufacture.

As discussed above, a jamming signal may be identified when the short-term noise average exceeds a predetermined or jamming threshold (JT) above the long-term noise average. In one embodiment, the long-term noise averages LLNA and RLNA are used for the antennas LA and RA, respectively. The jamming threshold may be selected from testing or by other criteria. In one embodiment, the predetermined value is 20 dB.

Figure 4:
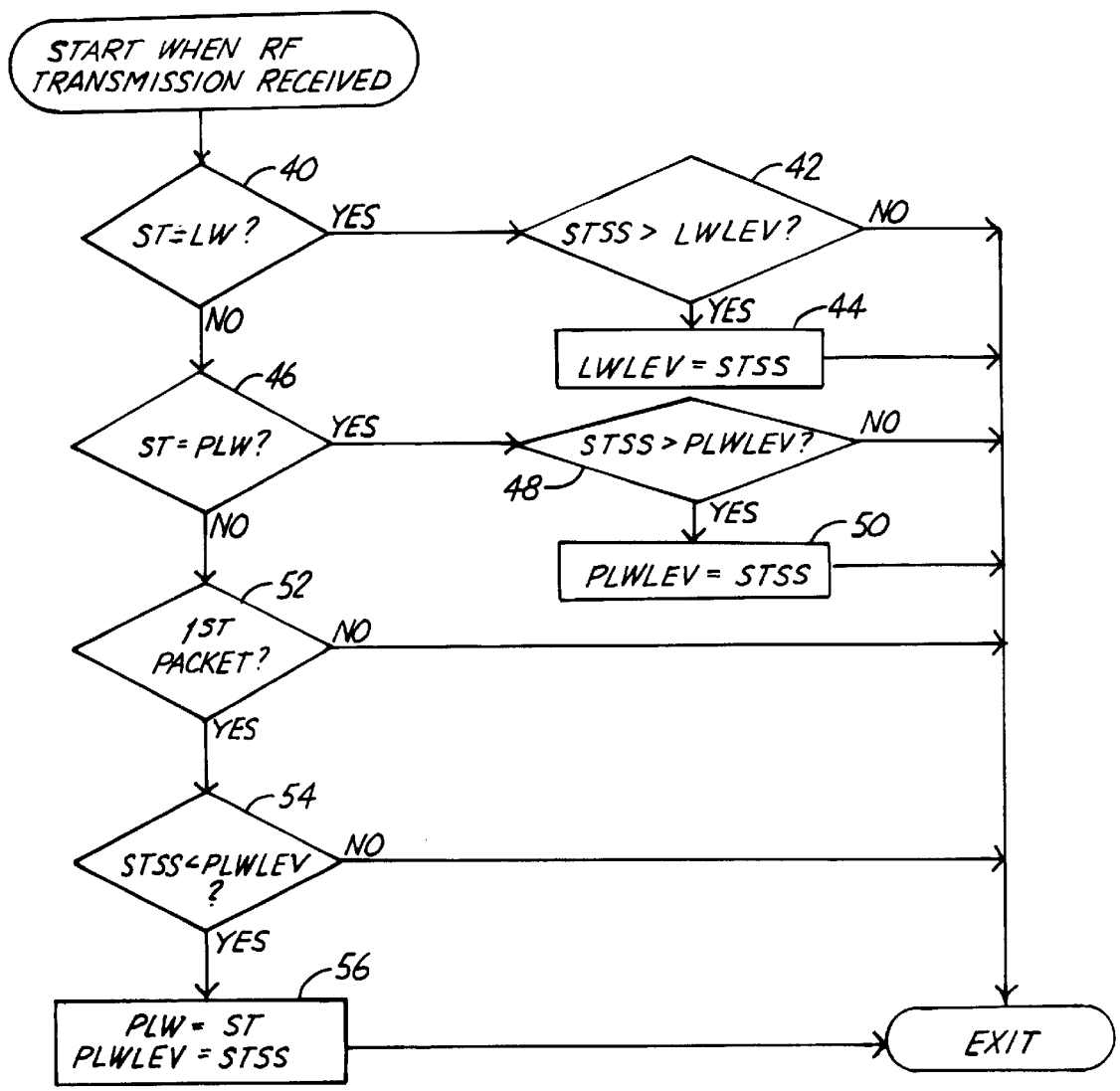
FIGS. 4 and 5 A-B are flow diagrams for an embodiment of a jamming detection method in accordance with the invention.

FIG. 4 is a flow chart showing the processing that is performed by processor 28 when an RF transmission from one of the transmitters 18 is received. The flow chart of FIG. 3 shows the processing for the left antenna LA only; the same processing would occur for the right antenna RA also. When the security system 10 is initialized and operating, the receiving unit 20 determines whether or not an RF transmission from one of the transmitters 18 is being received. As discussed above, the receiving unit 20 with its processing and data storage capabilities can use several techniques to determine whether a received signal is a transmission from one of the transmitters 18. When the receiving unit 20 receives a transmission, several variables for the antenna receiving the packet are updated.

When the left antenna has received the transmission, it is first determined, at step 40, whether the sending transmitter (ST) is the left antenna weak transmitter (LW). If so, at step 42 the signal strength of the sending transmitter (STSS) is compared to the left antenna weak transmitter level (LWLEV). If the signal strength is greater than LWLEV, then LWLEV is updated to be equal to STSS (step 44).

If ST is not the LW, it is determined, at step 46, whether ST is the proposed weak transmitter (PW). If so, and if STSS is greater than the proposed left antenna weak transmitter level (PWLLEV) as determined at step 48, then PWLLEV is updated to be equal to STSS (step 50).

If the sending transmitter ST is not the PW, it is determined whether it should be. The first packet of a group of duplicate packets is analyzed (step 52). If the signal strength STSS is less than PWLLEV (step 54), at step 56 the PW is updated to be ST, and PWLLEV is updated to be STSS.

If the message packets are being received on the right antenna, RA, the same steps are repeated for the right antenna weak transmitter (RW) and the proposed right antenna weak transmitter (PRW). Therefore, every time message packets are received on an antenna, the variables PLW and PWLLEV, or PRW and PWRLEV, may be updated.

If receiving unit 20 is not receiving a message packet, the noise level on each antennas (LA and RA) is periodically measured. In one embodiment, a measurement is made every one-eighth of a second, alternating between LA and RA. Therefore, the noise level for each antenna is measured four times per second. The short-term and long-term noise averages are computed after each noise level reading.

In one embodiment, the short-term noise average, STAVE, is computed as a running average of N measurements (e.g., eight) of noise level readings R. Therefore, at time t+1, the following equation is used:

$$STAVE(t+1)=[STAVE(t)*(N-1)+R(t+1)]/N$$

The short-term noise average reacts relatively quickly to changes in the noise level.

The long-term noise average is a running average of a much larger number of measurements (e.g., 14,400 samples which is one hour) of noise level readings R. The same running average computation as described above may be used. The long-term noise averages react more slowly to incremental changes in the noise level than the short-term averages, as shown by the exemplary averages plotted in the graph of FIG. 3. In other embodiments, different weightings can be used to compute the averages, or different statistical techniques can be used to compute short-term and long-term noise values.

Figure 5A:
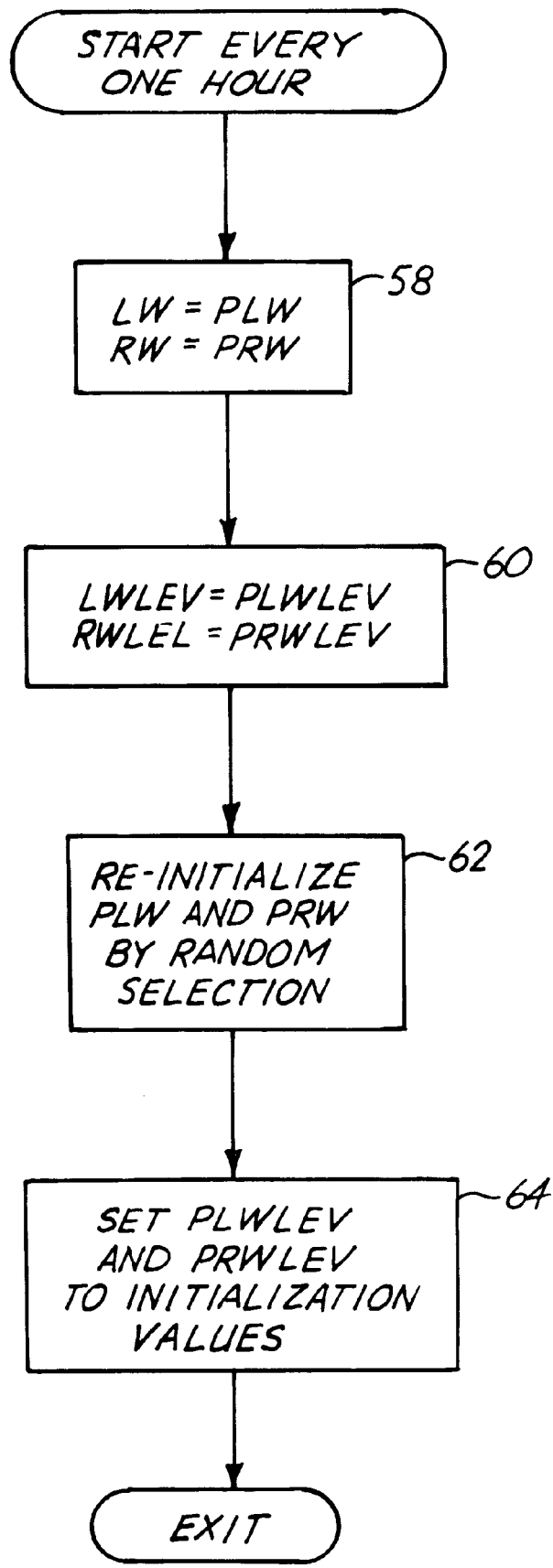

As shown in the flow diagram of FIG. 5A, every hour the weak transmitters (LW and RW) are updated; PLW becomes the new LW for the next hour, and PRW becomes the new RW for the next hour (step 58). The value of LWLEV is updated with the value of PWLLEV and the value of RWLEV is updated with the value of PWRLEV (step 60). New proposed weak transmitters (PLW and PRW) are re-initialized by random selection (step 62). The levels for these transmitters (PWLLEV and PWRLEV) are then set to the initialization values (step 64).

Figure 5B:
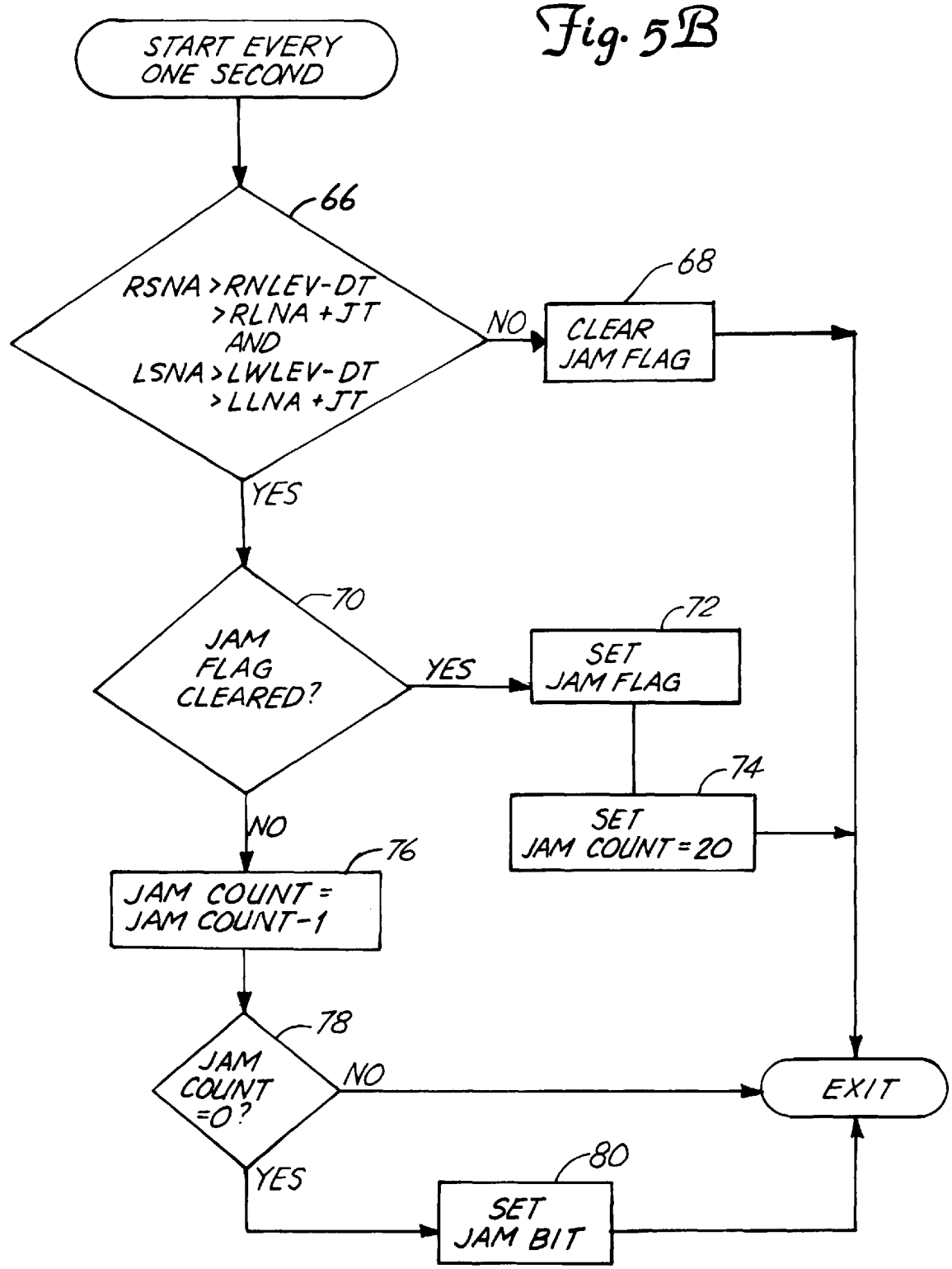

Once every second, receiving unit 20 determines whether a jamming signal is being received on the antennas 24. A flow diagram of jamming detection is shown in FIG. 5B. At step 66, for both right and left antenna, it is determined whether the short-term noise average (RSNA and LSNA) exceed both the weak-transmitter level (RWLEV and LWLEV) minus the detection threshold (DT) and the sum of the long-term noise average (RLNA and LLNA) and jamming threshold (JT). If not, a jam flag is cleared (step 68). If so and if it is the first jam signal detected (step 70), a jam flag is set (step 72) and a jam counter is set to twenty (step 74). For each consecutive jam signal detected, the jam counter is decremented (step 76). If the jam counter reaches zero (step 78), i.e., a jam signal was detected for twenty seconds, receiving unit 20 sets a jam bit indicating that jamming is occurring (step 80). This jam bit is sent to control unit 22 as part of the normal protocol between receiving unit 20 and control unit 22, and an alarm warning of the jamming condition may be sounded or forwarded to a remote monitoring stations or to the proper authorities (e.g., police department).

In another embodiment, the jamming comparison and jam count are made for each antenna 24 separately. Therefore, a jamming condition on only one of the antennas 24 may be detected or reported to control unit 22. In other embodiments, the initialization values, the time periods, and the various constants used, may be adjusted to meet the needs of the particular application.

In another embodiment, the signal strength of transmitters 18, as received by the antennas 24, are considered collectively. For example, if a transmitter 18 is not the weak transmitter on a first antenna 24, then it is disregarded as a weak transmitter for the other antennas. To implement this embodiment, the same variables, signal measurements, and jamming detection method described above are used. However, the weak transmitter update can be performed after the reception of each RF message packet.

Figure 6A:
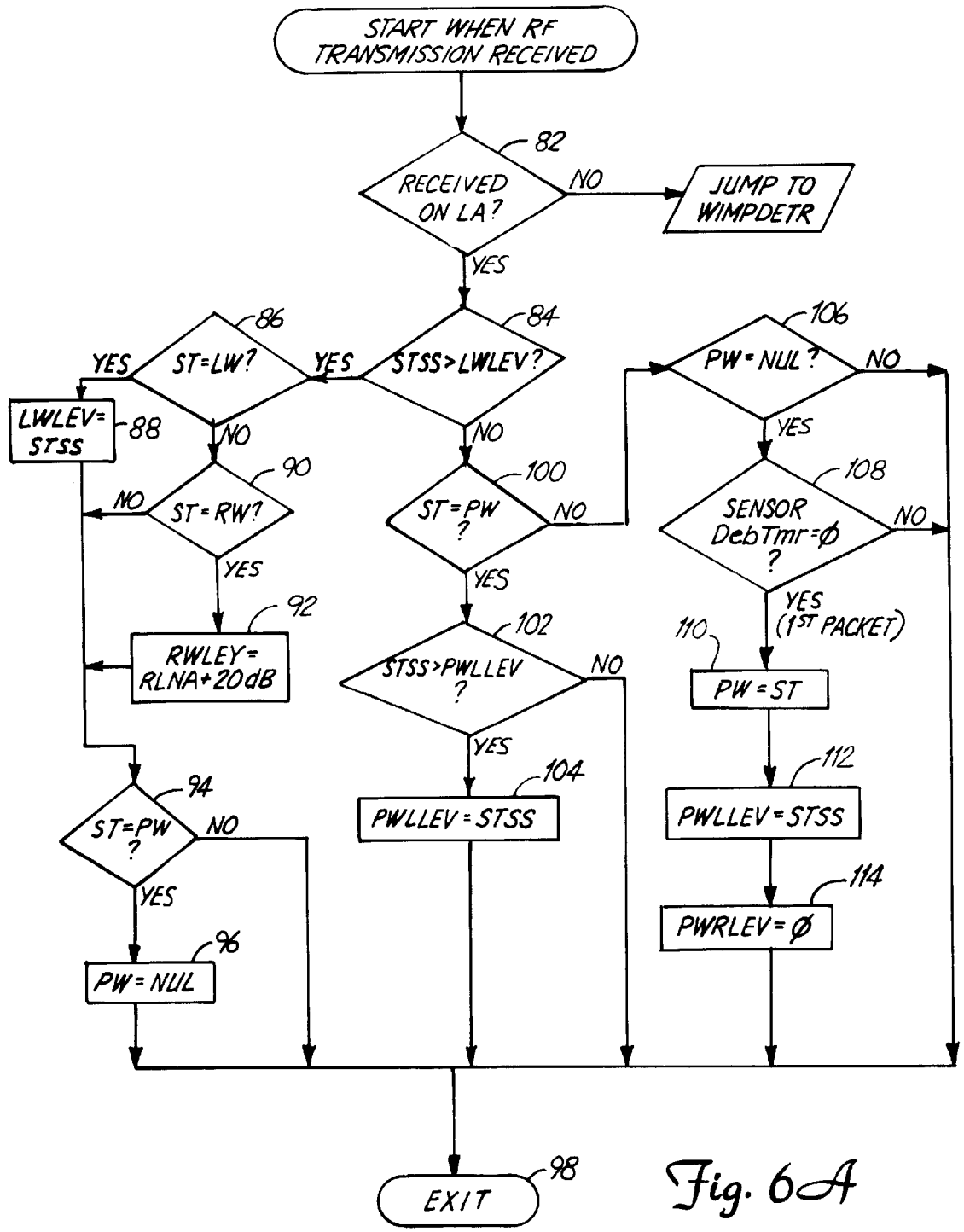
FIGS. 6A–C are flow diagrams for a second embodiment of a jamming detection method in accordance with the invention.
Figure 6B:
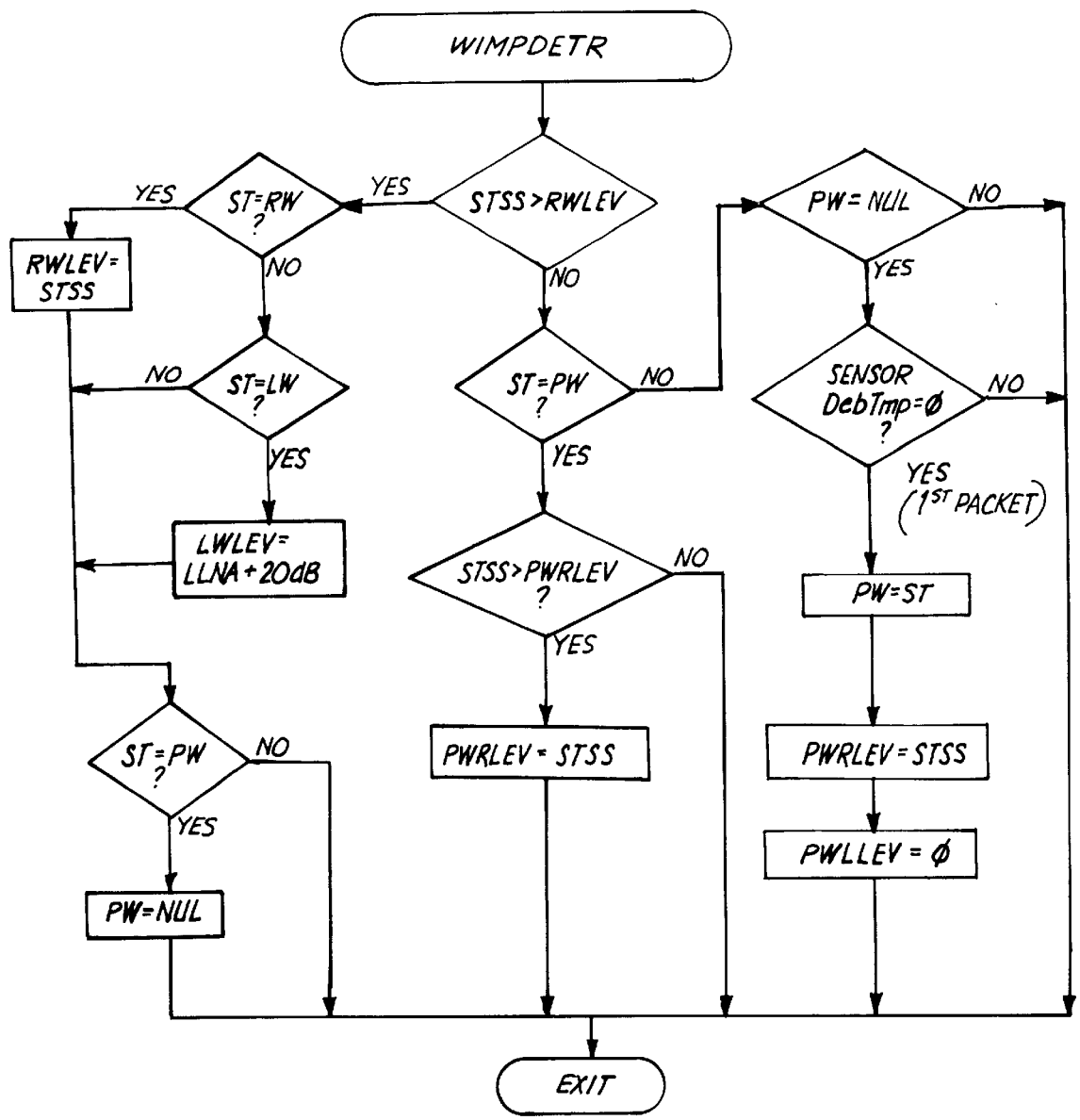
Figure 6C:
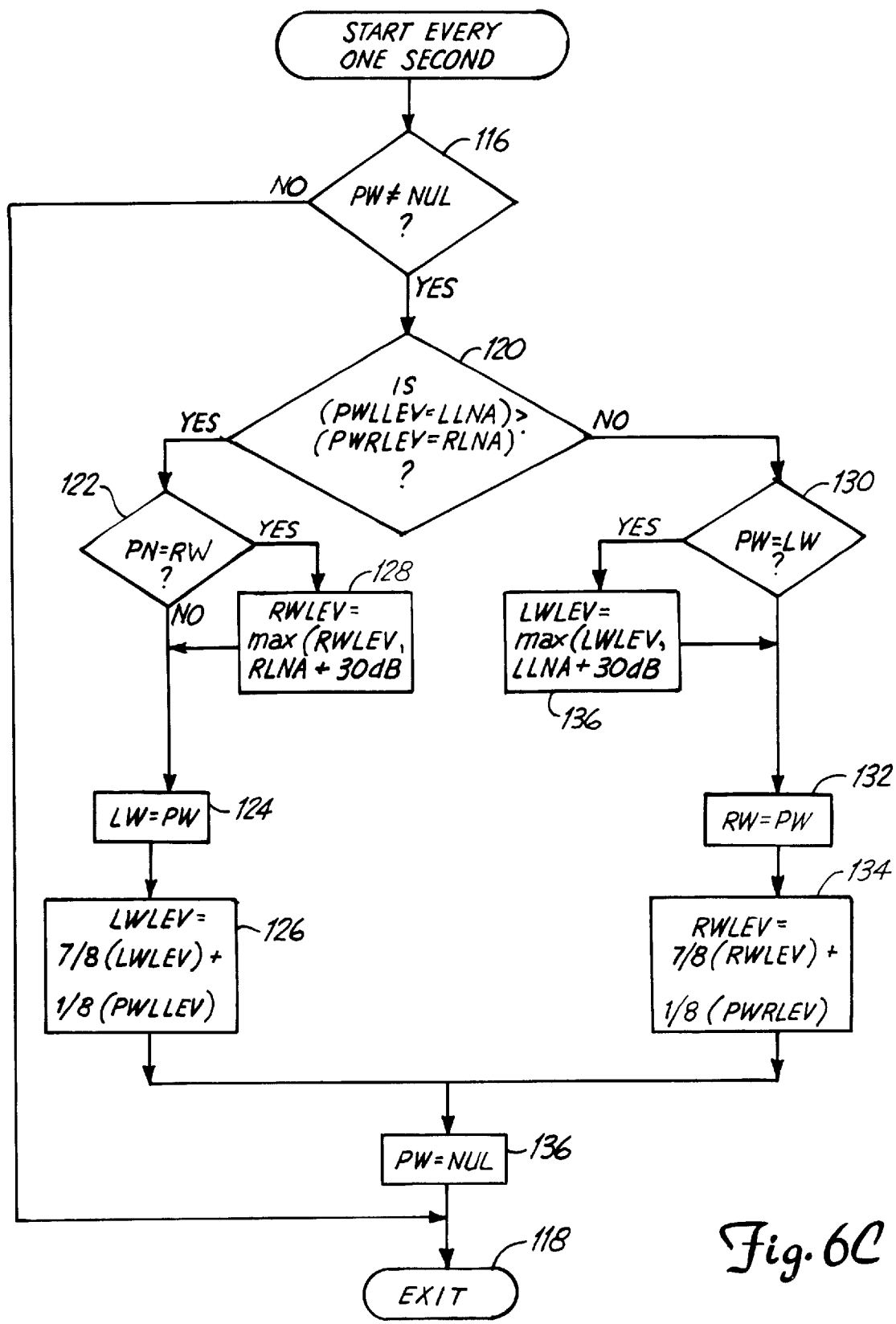

A flow chart of the weak transmitter update for this embodiment is shown in FIGS. 6A–C. As shown in FIG. 6A, at step 82 the system first determines whether the incoming transmitter signal ST is being received on the left antenna LA. If so, the incoming signal strength STSS is compared to the left antenna weak transmitter level (LWLEV) at step 84. If the signal is stronger than LWLEV, it is then determined at step 86 whether the incoming message is from the left antenna weak transmitter (LW). If so, LWLEV is updated to be STSS at step 88.

If the incoming message is not from the left antenna weak transmitter (LW) (step 86), it is determined whether the message is from the right antenna weak transmitter (RW) at step 90. If so, at step 92 the right antenna weak transmitter level (RWLEV) is set to be the right antenna long-term noise average (RLNA) plus a predetermined level, e.g., 20dB. The increase of RWLEV is made because the incoming message is shown to be not a weak transmitter. Therefore, it is advantageous to boost the weak transmitter level for the right antenna (RA) so that in the future it is easier for another sensor to become the right antenna weak transmitter (RW).

After any of steps 88 through 92, it is determined at step 94 whether the message is from the proposed weak transmitter (PW). If so, PW is zeroed at step 96 so that a new PW will be assigned. If the message is not from the PW, the routine is exited at step 98.

Referring back to step 84, if STSS is not stronger than the left antenna weak transmitter level (LWLEV), it is determined at step 100 whether ST is the proposed weak transmitter (PW). If so, STSS is compared to the proposed left antenna weak transmitter level (PWLLEV) at step 102. If STSS is greater than PWLLEV, the PWLLEV level is updated to equal STSS at step 104. If it is not, the routine is exited at step 98.

If the message is not from the proposed weak transmitter (PW) at step 100, it is then determined at step 106 whether the PW has been zeroed. If it has not, the routine is exited at step 98. If it has, the system determines, at step 108, whether the ST message packet is the first packet of a transmission. When a first packet is received, the debounce timer (DebTmr) is set to five seconds and counts back to zero. Therefore, only the first packet of a closely timed transmission passes to steps 110 through 114. At step 110, the proposed weak transmitter (PW) is updated to the current transmitter ST. At step 112, the proposed left antenna weak transmitter level (PWLLEV) is updated to be STSS. At step 114, the proposed right antenna weak transmitter level (PWRLEV) is zeroed.

Referring back to step 82, if the incoming signal is not received on the left antenna, the signal is processed for the right antenna as shown in FIG. 6B. The flow chart of FIG. 6B shows essentially the same process as that shown in FIG. 6A, except that the signals are received on RA.

The proposed weak transmitters are updated every second. As shown in the flow diagram of FIG. 6C, it is first determined at step 116 whether ST is a proposed weak transmitter (PW). If the packet is not from the PW, the system exits the routine at step 118. If the packet is from the PW, it is determined at step 120 whether PWLLEV minus LSNA is greater than PWRLEV minus RSNA.

If the difference between PWLLEV and LSNA is greater than the difference between PWRLEV and RSNA at step 120, it is determined at step 122 whether the PW is the same as RW. If they are not the same, LW is set equal to PW at step 124. The left antenna weak transmitter level LWLEV is updated to be the weighted average at step 126. If the PW is not equal to RW at step 122, then in addition to performing steps 124 and 126, the system at step 128 also sets RWLEV equal to the maximum of the RWLEV and RSNA plus 30 dB.

If PWLLEV minus LLNA is less than PWRLEV minus RLNA, then a similar update is performed as shown in FIG. 6C at steps 130 through 136, to update RW and RWLEV. After either steps 126 or steps 134, PLW and PRW are zeroed at step 136. After step 136, the system exits the routine at step 118.

Therefore, the weak transmitters and proposed weak transmitters are updated after the receipt of a message packet, and techniques are used to remove a transmitter as a weak transmitter or a proposed weak transmitter if it is sending sufficient signal strength. Although the flow diagram disclosed above describes a system with only two antennas, the same approach may be implemented for systems with any number of antennas.

In another embodiment, signal strength information for each transmitter/antenna combination is stored. The signal strength information is periodically updated. Also, short-term and long-term noise averages are computed for each antenna, e.g., as described above. A jamming signal is indicated when at least one sensor cannot be received by any of the antennas.

Figures 7, 8:
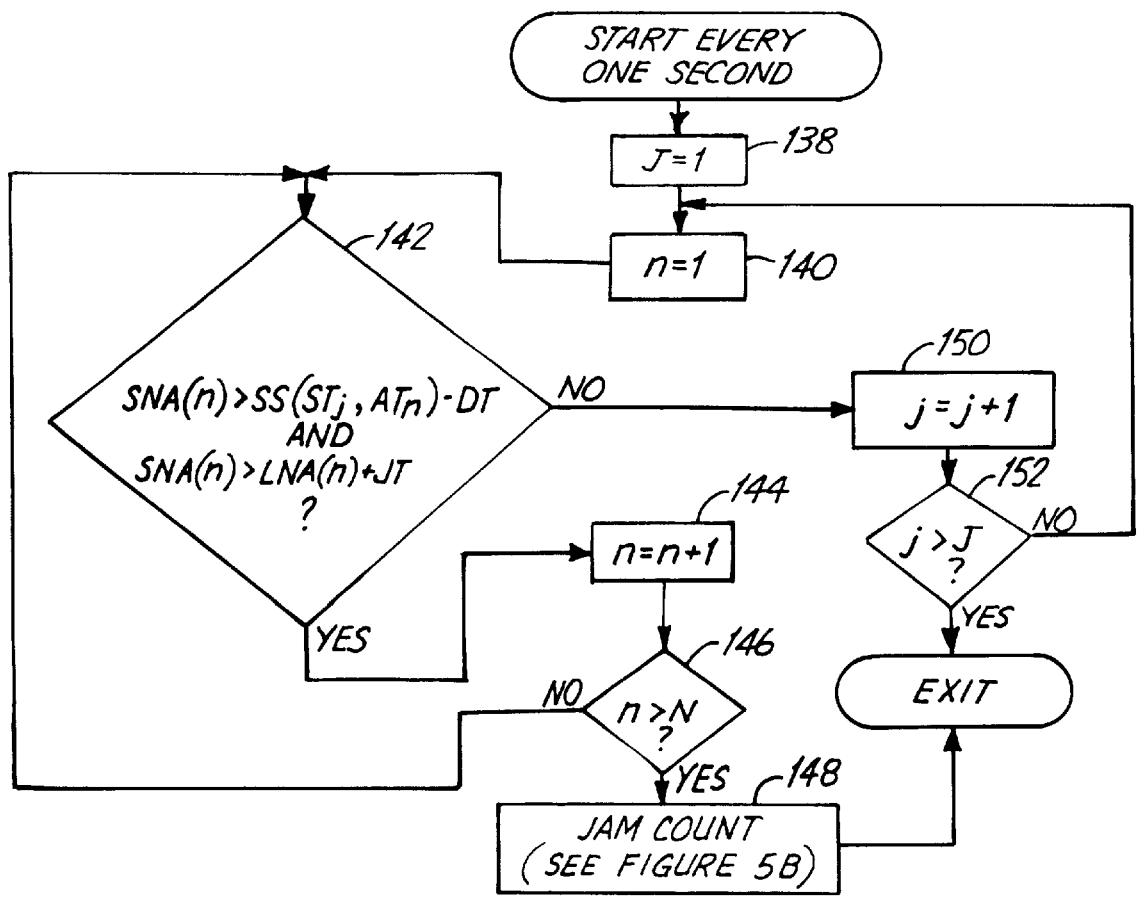
FIG. 7 is a signal strength table.
FIG. 8 is a flow diagram for a third embodiment of a jamming detection method in accordance with the invention, using the signal strength table of FIG. 7.

FIG. 7 shows an exemplary signal strength table for N antennas AT and J transmitters ST. This table may be implemented in memory 34 in a variety of ways. At start up, a rough guess is entered for each signal strength entry in the table. This could be done by waiting for the first transmission, and entering the first measured signal strength value. Alternatively, each signal strength value may be initialized to a maximum value, and will decrease from that value. Each time a sending transmitter $ST_j$ is received on an antenna $AT_n$ with a signal strength of $SS_{jn}$, the table entry for $SS(ST_j,AT_n)$ is updated according to the following:

if $SS_{jn} > SS(ST_j, AT_n)$, then $SS(ST_j, AT_n) = SS_{jn}$ else $SS(ST_j, AT_n) = SS_{jn} + (SS(ST_j, AT_n) - SS_{jn})*SF$
where SF is a sustain factor calculated to allow $SS(ST_j,AT_n)$ to drop within two percent of $SS_{jn}$ after two days of supervisory transmissions at the lower signal strength $SS_{jn}$. For example, in a system with three supervisory transmissions per hour, the sustain factor is 0.973.

In FIG. 8 there is a flow diagram of a jamming detection method using the signal strength table of FIG. 7. The FIG. 8 method could be executed, for example, every one second. At steps 138 and 140, the transmitter and antenna are both set to equal the first table entry, $ST_1AT_1$. At step 142, it is determined whether the short-term noise average for the antenna is greater than the table signal strength minus the detection threshold and also that the short-term noise average is greater than the long-term noise average plus the jam threshold. This scheme is similar to the jam detection scheme described above. If the two conditions are met, the antenna is incremented at step 144. If the process is incremented through all the antennas at step 146, a jam signal is detected and the jam counting process, e.g., as described above, is either initiated or continued at step 148. If not, i.e., all of the antennas have not been scrolled through, the process returns to the two-part jam determination step 142.

If the two inequalities of step 142 have not been met, the sensor is incremented at step 150. If all of the sensors have not been scrolled through at step 152, the process returns to step 140. If all sensors have been scrolled through, the process is exited.

Once again the initialization values, the time periods, and the various constants used, may be adjusted to meet the needs of the particular application.

Other embodiments are within the scope of the following claims.

What is claimed is:

1. A method of detecting RF jamming signals at a receiver in a system having a plurality of RF transmitters, comprising:

determining a short-term noise value;

determining a long-term noise value;

determining an expected received RF signal strength value;

generating a signal indicating the presence of a jamming condition if the short-term noise value exceeds the sum of the long-term noise value and a jamming threshold, and further exceeds the expected received RF signal strength minus a detection threshold.

2. The method of claim 1, wherein the short-term noise value is about an average of sampled noise values taken over a period of a few seconds and the long-term noise value is about an average of sampled noise values taken over a period of about one hour.

3. The method of claim 1, wherein the jamming threshold is about 20 dB.

4. The method of claim 1, wherein the detection threshold is an amount that the signal strength of a transmission received from one of the RF transmitters must exceed the noise level for the received RF transmission to be accurately detected by the receiver.

5. The method of claim 1, further comprising measuring the RF signal strength of transmissions received from the RF transmitters, and wherein the expected received RF signal strength value is determined from the RF signal strength of received transmissions.

6. The method of claim 5, wherein the expected received RF signal strength is the received RF signal strength of the RF transmitter having the weakest received RF signal strength.

7. The method of claim 6, further comprising determining about every hour which of the RF transmitters has the weakest received RF signal strength and selecting the received RF signal strength of that transmitter as the expected received RF signal strength value.

8. The method of claim 6, further comprising determining about every second which of the RF transmitters has the weakest received RF signal strength and selecting the received RF signal strength of that transmitter as the expected received RF signal strength value.

9. The method of claim 1, further comprising comparing about every second the short-term noise value to the sum of the long-term noise value and the jamming threshold, and to the expected received RF signal strength minus the detection threshold.

10. The method of claim 1, wherein the signal indicating the presence of the jamming condition is only generated if the jamming condition persists for a predetermined time period of about 20 seconds.

11. The method of claim 1, wherein the receiver includes a plurality of antennas, and the method further comprises:
   measuring the signal strength of transmissions received from RF transmitters for each antenna and determining therefrom an expected received RF signal strength value for each antenna;
   determining a short-term noise value for each antenna;
   determining a long-term noise value for each antenna;
   generating a signal indicating the presence of a jamming condition if, for any of the antennas, the short-term noise value for the antenna exceeds the sum of the long-term noise value for the antenna and a jamming threshold, and further exceeds the expected received RF signal strength for the antenna minus a detection threshold.

12. The method of claim 11, further comprising updating the expected RF stored signal strength value for an antenna when a message from an RF transmitter is received on the antenna.

13. A method of detecting RF jamming signals at a receiver in a system having a plurality of RF transmitters, comprising:
   determining a short-term noise value;
   determining a long-term noise value;
   determining an expected received RF signal strength value;
   analyzing the long-term noise value to determine if its trend is increasing by a predetermined amount; and
   generating a signal indicating the presence of a jamming condition if the short-term noise value exceeds the expected received RF signal strength minus a detection threshold, and further if the trend of the long-term noise value is increasing by the predetermined amount.

14. The method of claim 13, wherein the short-term noise value is an average of the noise level over a period of a few seconds and the long-term noise value is about an average of the noise level over a period of about one hour.

15. The method of claim 13, wherein the detection threshold is an amount that the signal strength for a transmission received from one of the RF transmitters must exceed the noise level for the transmission to be accurately detected by the receiver.

16. The method of claim 13, further comprising measuring the RF signal strength of transmissions received from the RF transmitters, and wherein the expected received RF signal strength value is set to the received RF signal strength of the RF transmitter whose received RF signal strength is the weakest.

17. A method of detecting RF jamming signals at a receiver in a system having a plurality of RF transmitters, comprising:
   determining a short-term noise value;
   determining a long-term noise value;
   determining an expected received RF signal strength value;
   analyzing the long-term noise value to determine if its trend is increasing by a predetermined amount; and
   generating a signal indicating the presence of a jamming condition if:
      the short-term noise value exceeds the sum of the long-term noise value and a jamming threshold, and further exceeds the expected received RF signal strength minus a detection threshold; or
      the short-term noise value exceeds the expected received RF signal strength minus a detection threshold, and further if the trend of the long-term noise value is increasing by the predetermined amount.

18. The method of claim 17, wherein the short-term noise value is about an average of the noise level over a period of a few seconds and the long-term noise value is about an average of the noise level over a period of about one hour.

19. The method of claim 17, wherein the detection threshold is an amount that the signal strength of a transmission received from one of the RF transmitters must exceed the noise level for the received RF transmission to be accurately detected by the receiver.

20. The method of claim 17, further comprising measuring the RF signal strength of transmissions received from the RF transmitters, and wherein the expected received RF signal strength value is set to the received RF signal strength of the RF transmitter whose received RF signal strength is the weakest.

21. The method of claim 17, wherein the jamming threshold is about 20 dB.

22. A wireless security system comprising:
   a plurality of RF transmitters;
   a system controller comprising a receiving unit adapted to receive RF transmissions from the RF transmitters, a signal-strength circuit adapted to measure a noise level when RF signals are not being received, and a processor adapted to determine a long-term noise value and a short-term noise value, wherein the processor is further adapted to indicate the presence of a jamming condition if the short-term noise value exceeds the sum of the long-term noise value and a jamming threshold, and further exceeds an expected received RF signal strength minus a detection threshold; and
   an indicator adapted to notify users of the presence of the jamming condition.

23. The wireless security system of claim 22, wherein the signal-strength circuit is further adapted to measure the signal strength of RF transmissions received from the RF transmitters, and wherein the expected received RF signal strength is determined from the RF signal strength of the received RF transmissions.

24. The wireless security system of claim 23, wherein the expected received RF signal strength is the received RF signal strength of the RF transmitter having the weakest received RF signal strength.

25. The wireless security system of claim 22, wherein the short-term noise value is about an average of sampled noise values taken over a period of a few seconds and the long-term noise value is about an average of sampled noise values taken over a period of about one hour.

26. The wireless security system of claim 22, wherein the jamming threshold is about 20 dB.

27. The wireless security system of claim 22, wherein the detection threshold is an amount that the RF signal strength of transmissions received from one of the RF transmitters must exceed the noise level for the signal to be accurately detected by the receiver.

28. The wireless security system of claim 22, wherein the processor is further adapted:

to analyze the long-term noise value to determine if its trend is increasing by a predetermined amount; and to indicate the presence of a jamming condition if the short-term noise value exceeds the expected received RF signal strength minus a detection threshold, and further if the trend of the long-term noise value is increasing by the predetermined amount.

29. A system controller for use with a wireless security system comprising a plurality of RF transmitters, the system controller comprising:

a receiving unit adapted to receive RF transmissions from the RF transmitters;

a signal-strength circuit adapted to measure a noise level when RF signals are not being received; and a processor adapted to determine a long-term noise value and a short-term noise value, wherein the processor is further adapted to indicate the presence of a jamming condition if the short-term noise value exceeds the sum of the long-term noise value and a jamming threshold, and further exceeds an expected received RF signal strength minus a detection threshold.

30. The system controller of claim 29, wherein the signal-strength circuit is further adapted to measure the signal strength of RF transmissions received from the RF transmitters, and wherein the expected received RF signal strength is determined from the signal strength of the received RF transmissions.

31. The system controller of claim 30, wherein the expected received RF signal strength is the received RF signal strength of the RF transmitter having the weakest received RF signal strength.

32. The system controller of claim 29, wherein the short-term noise value is about an average of sampled noise values taken over a period of a few seconds and the long-term noise value is about an average of sampled noise values taken over a period of about one hour.

33. The system controller of claim 29, wherein the jamming threshold is about 20 dB.

34. The system controller of claim 29, wherein the detection threshold is an amount that the signal strength of a transmission received from one of the RF transmitters must exceed the noise level for the signal to be accurately detected by the receiver.

35. The system controller of claim 29, wherein the processor is further adapted:

to analyze the long-term noise value to determine if its trend is increasing by a predetermined amount; and to indicate the presence of a jamming condition if the short-term noise value exceeds the expected received RF signal strength minus a detection threshold, and further if the trend of the long-term noise value is increasing by the predetermined amount.

* * * * *